United States Patent
Neundorfer et al.

(10) Patent No.: US 7,295,932 B2
(45) Date of Patent: Nov. 13, 2007

(54) CONTROL SYSTEM AND TECHNIQUE FOR PARTICULATE COLLECTION SYSTEMS

(75) Inventors: Michael W. Neundorfer, Willoughby Hills, OH (US); Kyle W. Campbell, Pittsburgh, PA (US); Christopher C. Kerwood, Concord, OH (US); Jeremy W. Timmons, Chesterland, OH (US)

(73) Assignee: Neundorfer, Inc., Willoughby, OH (US)

( * ) Notice: Subject to any disclaimer, the term of this patent is extended or adjusted under 35 U.S.C. 154(b) by 0 days.

(21) Appl. No.: 10/872,943

(22) Filed: Jun. 22, 2004

(65) Prior Publication Data
US 2005/0283322 A1    Dec. 22, 2005

(51) Int. Cl.
*G01F 1/00* (2006.01)
(52) U.S. Cl. ..................................... 702/45
(58) Field of Classification Search .................. 702/45, 702/47, 50
See application file for complete search history.

(56) References Cited

U.S. PATENT DOCUMENTS

| | | | | |
|---|---|---|---|---|
| 4,582,454 A | * | 4/1986 | Brandenburg et al. | 406/32 |
| 5,685,243 A | * | 11/1997 | Gohara et al. | 110/345 |
| 6,156,114 A | * | 12/2000 | Bell et al. | 106/400 |
| 6,364,473 B1 | * | 4/2002 | Liu | 347/85 |
| 6,383,301 B1 | * | 5/2002 | Bell et al. | 118/716 |

* cited by examiner

*Primary Examiner*—Michael Nghiem
(74) *Attorney, Agent, or Firm*—Renner, Kenner, Greive, Bobak, Taylor & Weber

(57) ABSTRACT

Methods are provided for monitoring particulate flow distribution throughout particulate collection systems that employ collection vessels such as hoppers and feeders. The collection vessels are positioned in a grid pattern, and the amount of particulate collected from a given collection vessel is recorded as associated with that collection vessel's position in the grid, so that the particulate flow distribution can be analyzed. By analyzing the flow distribution, faults in the collection system can be discovered and addressed. Methods are also provided to ensure proper functioning of the emptying of particular collection systems employing hoppers that discharge particulate into feeders.

20 Claims, 13 Drawing Sheets

CONTROL SYSTEM AND TECHNIQUE FOR PARTICULATE COLLECTION SYSTEMS

TECHNICAL FIELD

The present invention generally resides in the art of particulate collection and evacuation systems, and, more particularly, resides in the art of control methods and techniques for monitoring evacuation systems and identifying failures therein.

BACKGROUND OF THE INVENTION

Particulate evacuation systems are employed in many particulate collection processes to transport and store the materials collected in those processes. For example, when coal is burned, the non-combustible portion of the coal, generally known as "fly ash" or "ash," is removed from the exhaust gases in the coal-burning operation in order to prevent the fly ash from exiting the exhaust stack and fouling the environment. As another example, in the cement industry, a cement kiln has a lot of carryover dust, and a bag house or electrostatic precipitator is employed to prevent the dust from entering the environment. The potentially harmful particulate (e.g., fly ash, cement dust) is collected in hoppers from where they are recycled into the process or transported to larger and more permanent storage vessels. The invention herein focuses upon hopper evacuation systems in association with electrostatic precipitators, although it should be appreciated that general concepts herein are applicable to other particulate evacuation systems. The potential for expanding the concepts herein beyond electrostatic precipitators and to particulate collection and evacuation systems in general will be appreciated by those of ordinary skill in the art. Furthermore, the term "hopper" should be interpreted to apply to all types of particulate collection vessels, and not only those collection vessels specifically referred to as "hoppers" in the industry.

With reference to FIGS. 1-3, prior art particulate collection and evacuation systems, particularly hopper evacuation systems, are disclosed. These hopper evacuation systems are associated with electrostatic precipitators (FIG. 1), and, as noted above, need not be limited to this environment. In FIG. 1, electrostatic precipitator 10 includes electrically charged collection plate arrays 12, positioned above a plurality of hoppers 14. The collection plate arrays 12 are charged to attract and collect the particulate introduced to precipitator 10, for example, fly ash from a coal-burning operation. By rapping the arrays 12, the collected particulate is caused to fall and collect in hoppers 14. Hoppers 14 are organized in a grid pattern below the collection plate arrays 12, as is schematically depicted in FIGS. 2 and 3, where they are identified by a position number (position 1, position 2, position 3) in a given hopper row (row A, row B, row C). Usually, one hopper 14 will be associated with one collection plate array 12, although sometimes a hopper 14 may cover only a part of a given collection plate array 12 or may overlap and cover more than one collection plate array 12. Hoppers 14 cover the complete collecting area of electrostatic precipitator 10, such that all of the collected particulate is disposed in the hoppers 14, where they can be exhausted from the system.

In FIG. 2, a hopper evacuation vacuum system is schematically shown. In a vacuum system, hoppers 14 communicate directly with transport line system 16 through hopper outlet gates 18. The entire transport line system in under vacuum as a result of a vacuum source, generally represented by the numeral 20, that serves to transport particulate to a storage vessel 22. In the vacuum system, the contents of each hopper 14 are generally emptied one at a time, on a time-based or pressure-based cycle, so that there is never more than one hopper 14 emptying into transport line system 16 at any one time. Valves 24A, 24B, and 24C, respectively positioned in hopper row A, row B, and row C, selectively open and close the communication between their respective hopper row and vacuum source 20, such that the vacuum may be selectively applied to the row in which a hopper 14 is being emptied. When a given hopper 14, for instance the one at row A, position 1, is emptying to transport line system 16, the valves 24B and 24C associated with rows B and C (i.e., all rows other than row A) are closed so that only row A communicates with vacuum source 20. Thus, the particulate collected in the hopper 14 at row A, position 1, fall out of the hopper 14 and into the transport line system 16, and are transported to a storage vessel 22, such as a silo or ash pond. Some evacuation systems may have a different configuration of valves and piping.

In FIG. 3, a hopper evacuation pressure system is disclosed, and like parts between the vacuum system of FIG. 2 and the pressure system receive like numerals. Unlike hoppers 14 in the vacuum system, hoppers 14 of the pressure system associate with transport line system 16 through feeders 26. Functionally, these feeders 26 are similar to the hoppers 14 in the vacuum system inasmuch as they empty particulate to a transport line. Indeed, feeders and hoppers are considered herein to fall within the broad interpretation of the term "collection vessel(s)."

Feeders 26 are airlock type feeders, with inlet gates, herein termed "hopper outlet gates" 28, and feeder outlet gates 30. Feeder vent lines 32 selectively communicate between each hopper 14 (or other low pressure source) and its associated feeder 26 through valves 34. To empty a hopper 14, the feeder vent line 32 associated with that hopper is opened at valve 34 to equalize the pressures within the hopper 14 (or other low pressure source) and its associated feeder 26. Thereafter, hopper outlet gate 28 is opened to feeder 26, and particulate within hopper 14 falls by gravity to feeder 26. After hopper outlet gate 28 is closed, feeder 26 is pressurized slightly above the pressure of transport line system 16, through a pressure source 36, feeder pressure line 38, and valve 37. Feeder outlet gate 30 is then opened, and the collected particulate flows by gravity and the slight pressure differential into transport line system 16. The entire transport line system 16 is pressurized by a system blower 40, that serves to transport particulate to a storage vessel 22. Similar to the vacuum system of FIG. 2, valves 24A, 24B, and 24C, respectively positioned in each hopper row A, row B, and row C, selectively open and close the communication between each respective hopper row and the system blower 40, such that the pressure supplied by the system blower 40 may be selectively applied to the row in which a feeder 26 is being emptied. Feeder outlet gate 30 is closed, and collected particulate is discharged into transport line system 16 and transported to storage vessel 22 by a positive pressure differential generated by system blower 40. In some embodiment, pressure source 36 and system blower 40 may be a common pressure source.

Such pressure and vacuum systems were historically controlled by a system of mechanical cam timers and relay logic. Many of these control systems have not changed since they were installed, sometimes as long as sixty years ago. As indicated, hopper evacuation is most often simply time based, with each hopper in each row emptying at a specific time in a repetitious cycle. Some hopper systems operate on rudimentary pressure feedback principals to adjust cycle time, and employ timers as a backup. Such control schemes do not account for the natural variations in particulate loading at each hopper, and offer little or no troubleshooting capabilities.

Hopper evacuation systems are being expected to perform in ways that originally were not intended. Changes in the amounts and characteristics of the particulate being handled by the systems require a better understanding of evacuation systems and a greater flexibility in system control. This flexibility and system performance analysis is not available in existing control methods, and most systems are not working at fill capacity for the current needs.

High maintenance troubleshooting is also an issue with these systems. System components are under constant pressure or vacuum, and air that is saturated with particulate matter is continuously flowing through the system. Problems with the piping or gates and valves are difficult to detect due to the closed nature of the system. It is difficult, if not impossible, to tell if the system is functioning incorrectly until a dangerously high volume of particulate collects in a hopper or feeder (collection vessel) as a result of a malfunctioning of the evacuation system. These high volume situations can create problems that are costly and dangerous to repair.

Thus, there is a need in the art for particulate collection systems that evacuate individual collection vessels based upon the collection of data rather than simple time-based or feedback-based sequences. There is also a need in the art of particulate collection and evacuation systems for a control system that can be monitored and that can troubleshoot a particulate evacuation system.

SUMMARY OF THE INVENTION

In light of the forgoing, the present invention provides, in one embodiment, a method for diagnosing particulate flow distribution within a particulate evacuation system that includes a plurality of collection vessels for collecting particulate and emptying the particulate to a transport line system. The method includes the steps of reading process data indicative of the amount of particulate emptied from each of the plurality of collection vessels; recording the process data obtained in said step of reading process data; and determining the particulate flow distribution within the particulate evacuation system, wherein the particulate flow distribution is derived from the process data.

In particularly preferred embodiments, the collection vessels are arranged in a grid pattern, and the step of determining the particulate flow distribution includes graphically displaying the process data by presenting the amount of particulate emptied from each of the plurality of collection vessels as associated with its position in the grid pattern. Most preferably, the graphic display is a three dimensional bar graph.

The general method may be practiced with vacuum systems and pressure systems, and vacuum and pressure data, respectively, may be the process data that is monitored to derive the particulate flow distribution. Also, as an alternative, the process data can be actual volume readings taken from continuous or point level sensors placed within the collection vessels.

In another embodiment of this invention, a method is provided for diagnosing problems in a feeder operation in a particulate evacuation system that includes a hopper for collecting particulate; a feeder having an inlet gate associated with the hopper and an outlet gate associated with a transport line; a vent line communicating between a low pressure source and the feeder; and a pressurization line communicating between the feeder and a pressure source, wherein both the vent line and the pressurization line may be selectively opened and closed. The method for diagnosing problems in such a system includes the steps of monitoring the pressure within the low pressure source; monitoring the pressure within the feeder; opening the vent line that communicates between the hopper and the feeder; and, after said step of opening the vent line, comparing the pressure within the feeder to the pressure within the low pressure source.

In accordance with this method, a signal is provided if the pressure within the feeder is greater than the pressure within the low pressure source after said step of opening the vent line. However, if the pressure within the feeder is less than or equal to the pressure within the low pressure source, the method further comprises maintaining the vent line open, and opening the inlet gate to allow particulate collected in the hopper to enter the feeder. After said step of opening the inlet gate, the method further comprises monitoring the pressure within the pressurization line; closing the inlet gate and the vent line and thereafter opening the pressurization line that communicates between the feeder and the pressure source; and, after said step of opening the pressurization line, comparing the pressure within the feeder to the pressure of the transport line.

In accordance with this step in the method, a signal is provided if the pressure within the feeder is less than the pressure of transport line. However, if the pressure within the feeder is greater than or equal to the pressure of the transport line, the method further comprises maintaining the pressurization line open; and opening the outlet gate to allow particulate collected in the feeder to enter the transport line.

Finally, after said step of opening the outlet gate, the method further comprises monitoring the pressure within the transport line, the pressure within the feeder, and the pressure within the pressurization line; comparing the pressure within the feeder to the pressure within the transport line and the pressure within the pressurization line; and providing a signal if the pressure within the feeder does not lie between the pressure within the pressurization line and the pressure within the transport line.

PREFERRED EMBODIMENT FOR CARRYING OUT THE INVENTION

Figure 1:
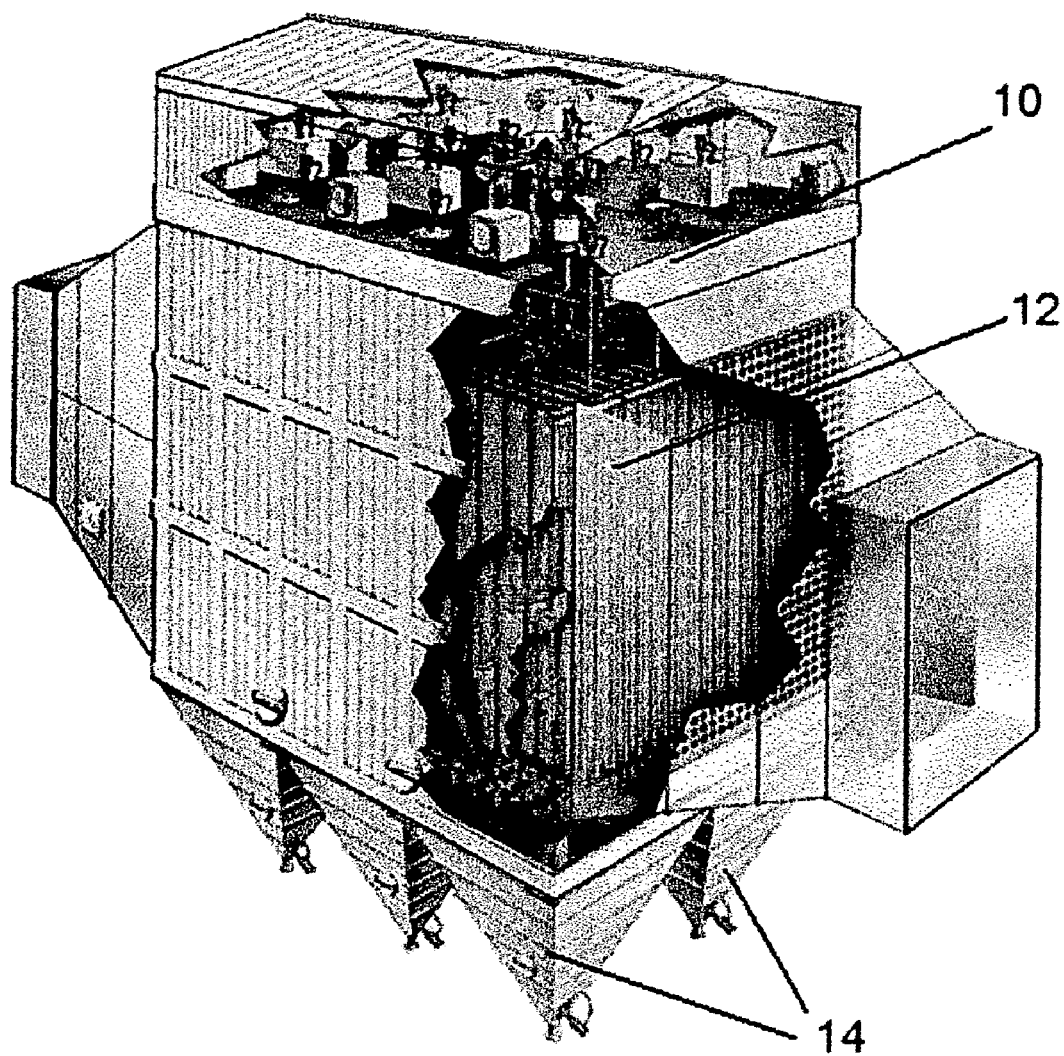
FIG. 1 is a perspective view of an electrostatic precipitator, with a portion thereof cut away to reveal the interior thereof.
Figure 2:
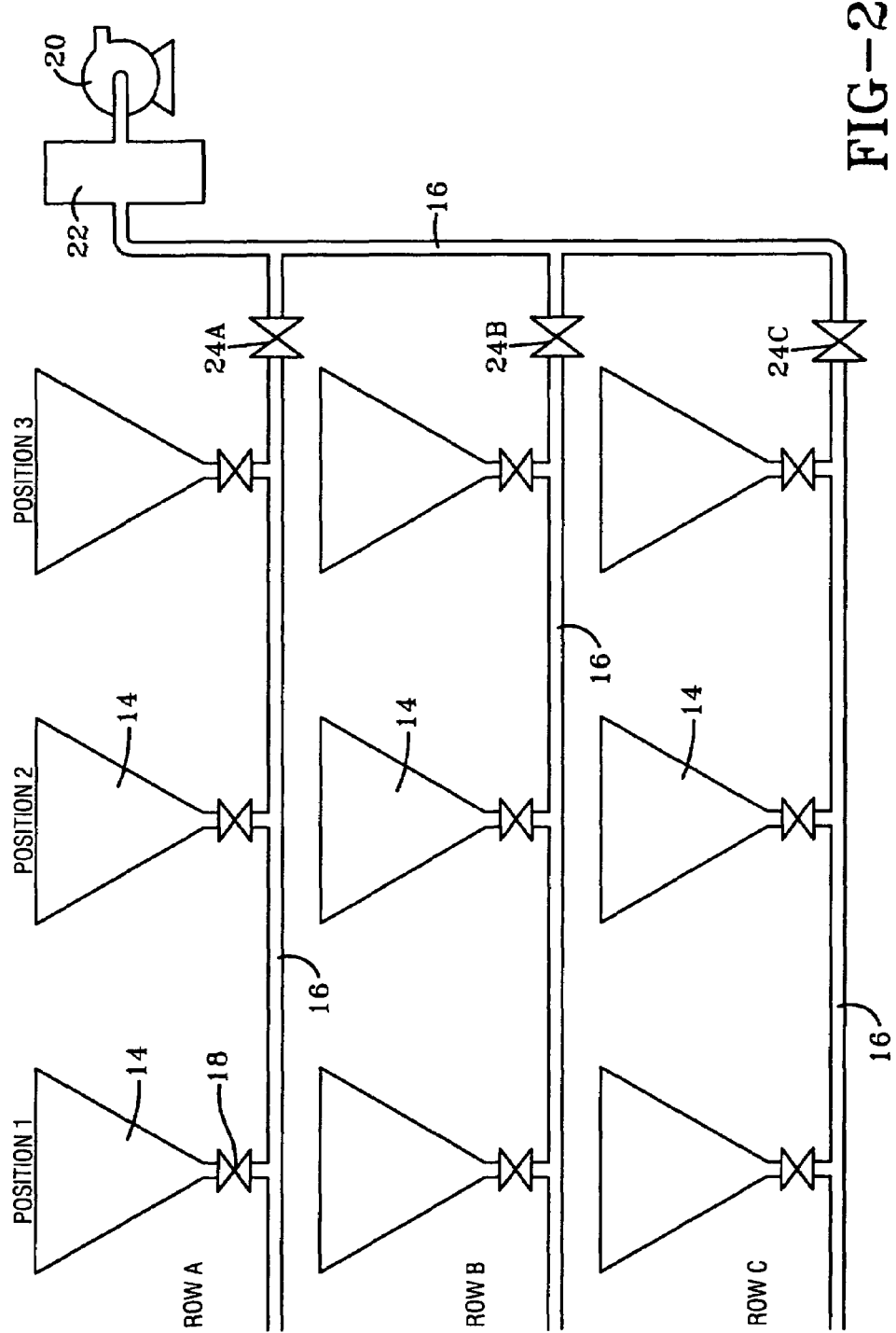
FIG. 2 is a schematic diagram of a hopper evacuation vacuum system, wherein the plurality of hoppers form a grid pattern.
Figure 4:
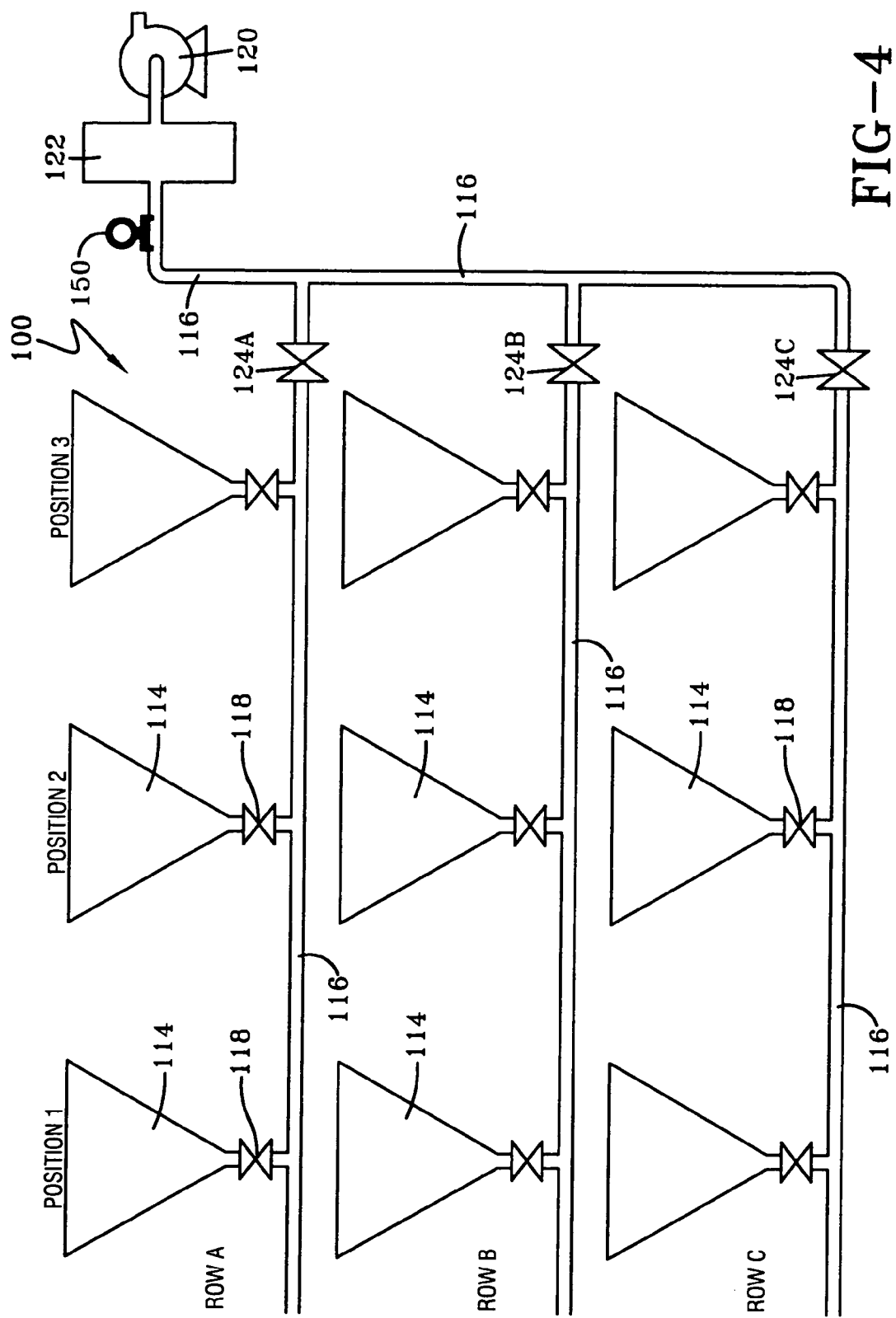
FIG. 4 is a schematic diagram of a hopper evacuation vacuum system in accordance with the present invention.
Figure 5:
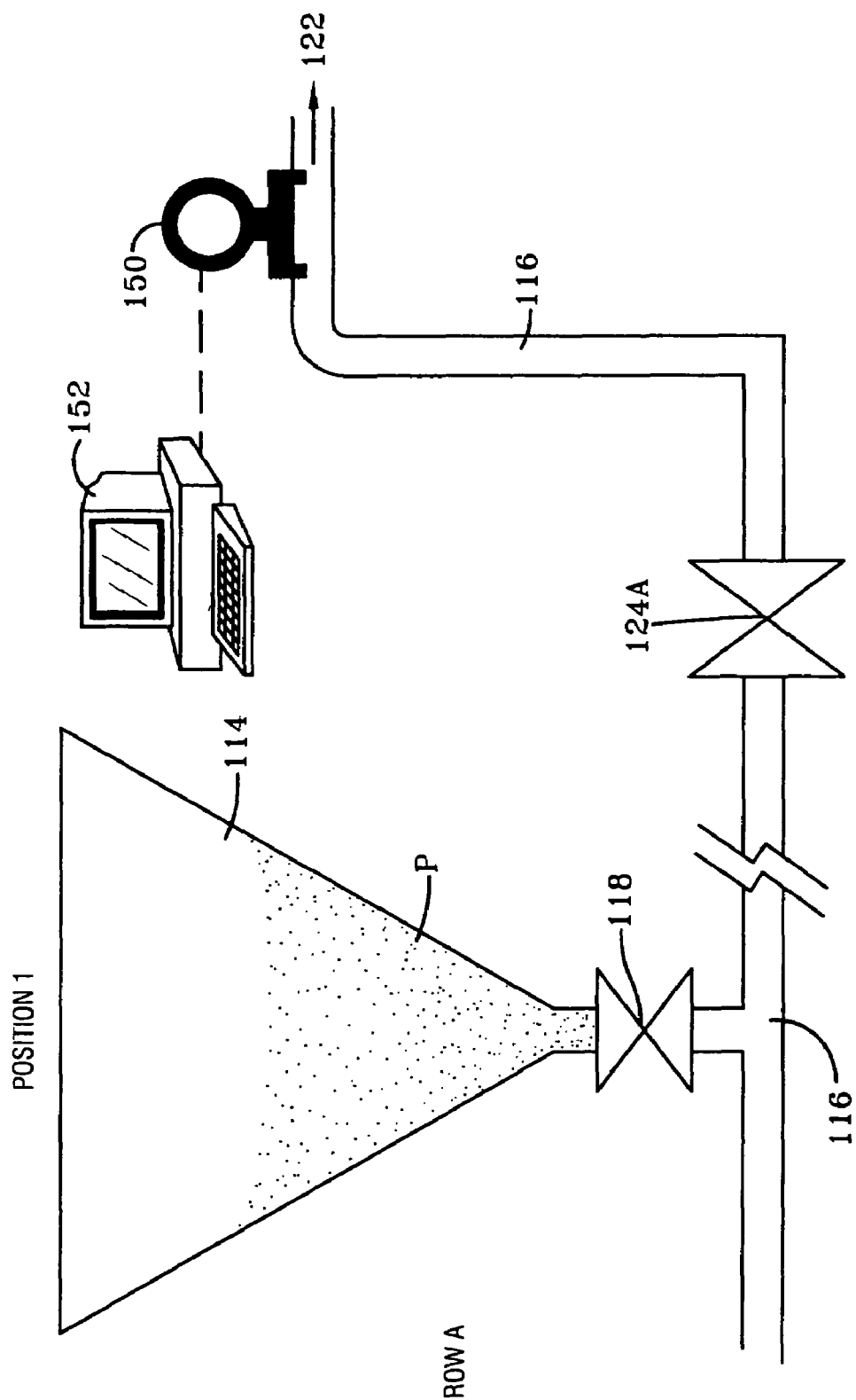
FIG. 5 is an exploded view of a single hopper, at position 1, row A of FIG. 4, and its communication with the transport line system in a hopper evacuation vacuum system according to the present invention.

Referring now to FIGS. 4 and 5, a hopper evacuation vacuum system according to this invention is shown and designated by the numeral 100. Vacuum system 100 is similar in many respects to the prior art vacuum system disclosed with reference to FIG. 2, and, like parts of vacuum system 100 are identified with like numerals increased by 100. Vacuum system 100 includes a plurality of hoppers 114 arranged in a grid pattern, and operates substantially as described in the background section with reference to FIG. 2.

Typically, only one hopper 114, empties into transport line system 116 at a time, and transport line system 116 is under vacuum to transport particulate P to a storage vessel 122. A hopper 114 at row A, position 1 is shown in FIG. 5, and the emptying of this hopper 114 is considered below, with the understanding that other hoppers 114 at other positions and rows empty in a similar manner at their allotted time in the emptying cycle. More particularly, valve 124A, associated with hopper row A, is opened, while valves 124B and 124C to all other hopper rows are closed, such that the vacuum supplied by vacuum source 120 is selectively applied to hopper row A. Once the appropriate valves 124B and 124C (not associated with the emptying hopper 114 of FIG. 5) are closed and the appropriate valve 124A (associated with the emptying hopper 114 of FIG. 5) is opened, particulate P is emptied by opening hopper outlet gate 118 to allow particulate P to fall to transport line system 116.

Figure 6:
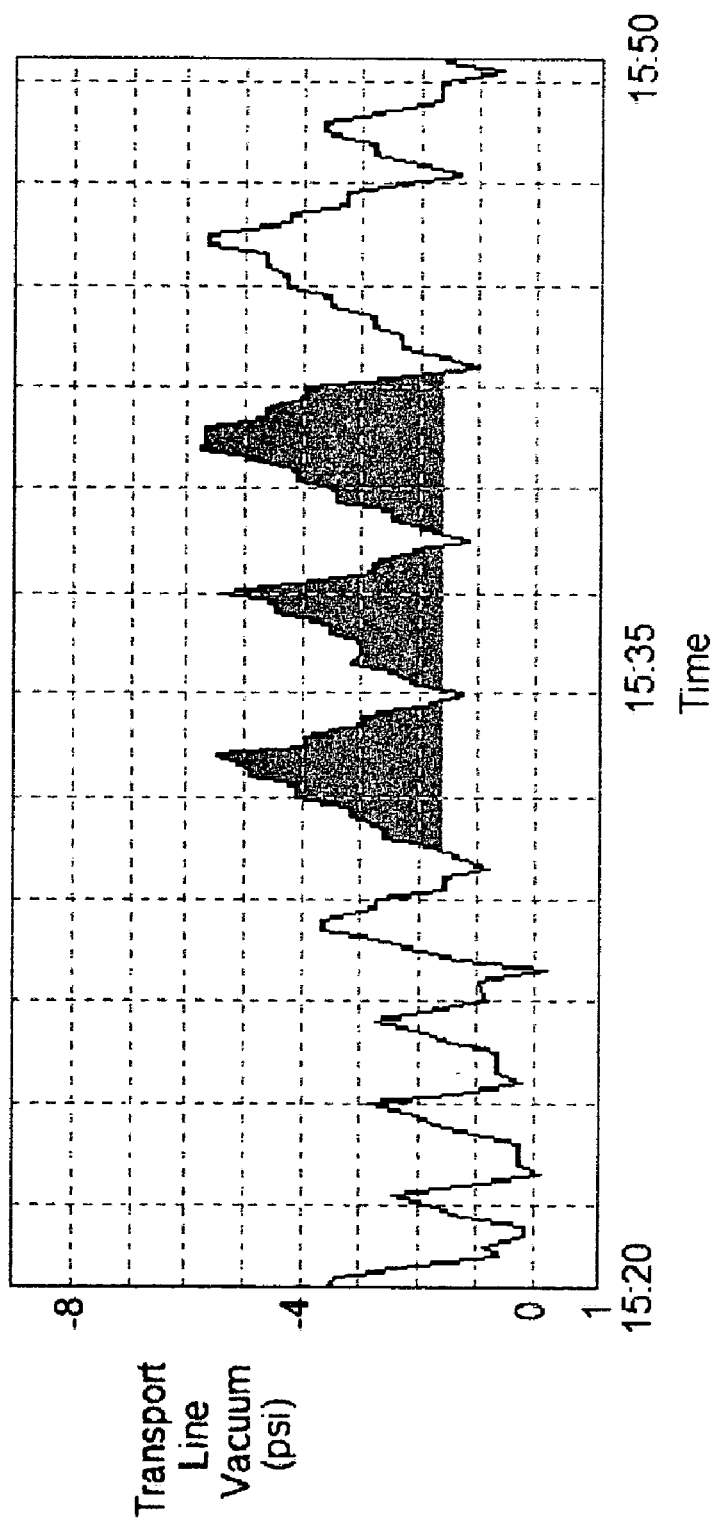
FIG. 6 is an exemplary plot of vacuum pressure versus time during hopper (vacuum system) evacuation.

Every time particulate P falls out of one of the hoppers 114 and into transport line system 116 (i.e., when outlet gate 118 opens), the vacuum in transport line system 116 increases. A pressure sensor 150 reads pressure data corresponding to the change in pressure in transport line system 116 each time an outlet gate 118 is opened. The pressure data is transmitted to a microprocessor 152 or other data processor capable of manipulating the data received. The amount of particulate P evacuated from each hopper 114 is related to the area under this curve, and, thus, an integration is performed, via microprocessor 152, for the time that the outlet gate 118 was opened. This is generally shown in FIG. 6, wherein the shaded portion under the curve represents the integration. The microprocessor 152 records and logs this pressure data, and, in preferred embodiments, this data is employed to graphically display the flow distribution within the hopper evacuation system 100.

It should be appreciated that, although pressure data is read and transmitted in the particular embodiment disclosed above, any process data indicative of the amount of particulate emptied from each of the plurality of hoppers 114 might be read and transmitted and employed as disclosed below for determining the particulate flow distribution throughout the hopper evacuation system. Additionally, as will be seen in other preferred embodiments below, actual volume data may be read and transmitted by the use of continuous level sensors or point level sensors. The main concern here is that some measurable process data indicative of the amount of particulate emptied from each hopper or feeder is read and transmitted in order to derive therefrom important process information.

Figure 8:
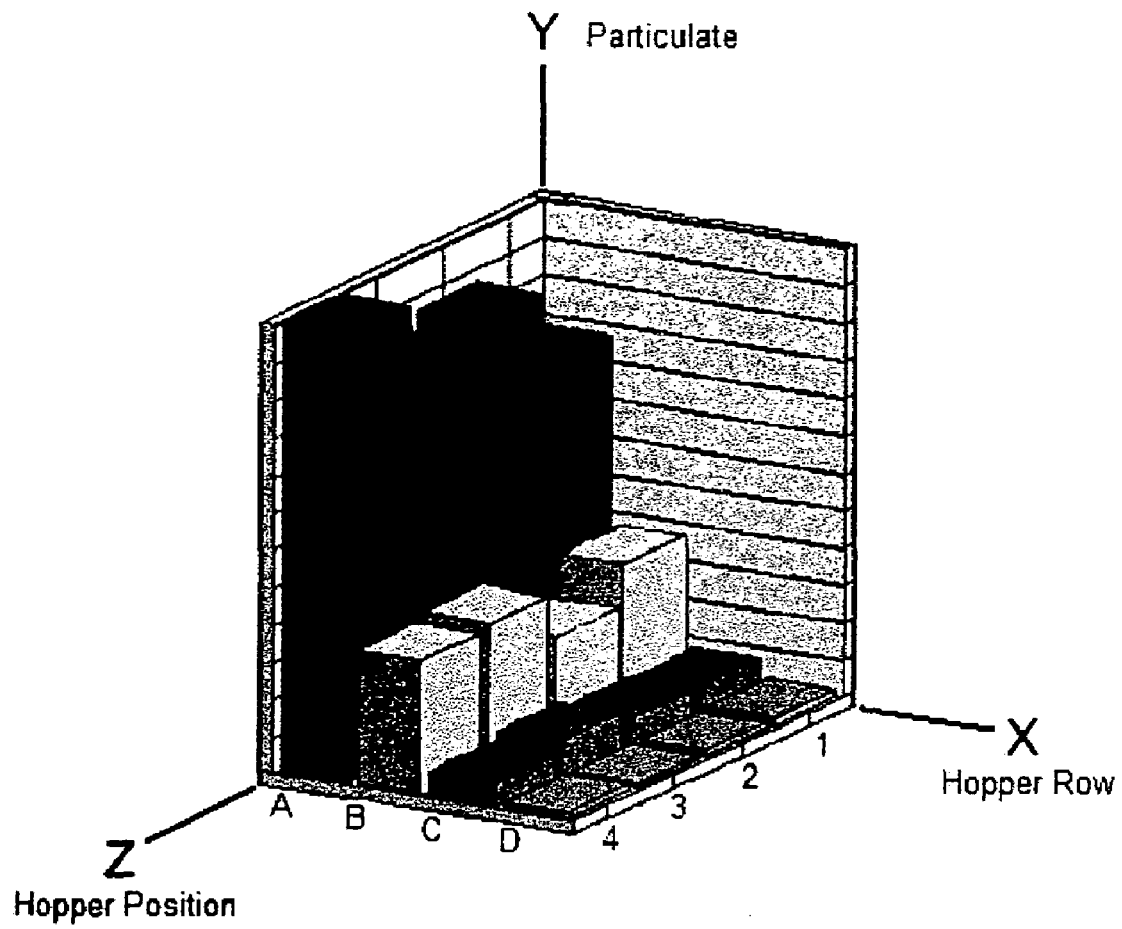
FIG. 8 is an exemplary bar graph showing data indicative of the amount of particulate evacuated from each hopper (vacuum system) or feeder (pressure system) within a grid pattern, wherein each row of hoppers/feeders is represented by a letter and is associated with a number to specifically identify the position of each hopper/feeder within the grid pattern.

The logged pressure data associated with each hopper 114 is summed over a selected time period and displayed graphically by any appropriate means. A three dimensional bar graph is particularly preferred because it is useful for providing a visual display of the flow distribution within the plurality of hoppers 114. Each hopper may be represented by one bar on the bar graph, while the amount of particulate P evacuated from each hopper (determined by the integration method above or any other appropriate method employing process data) determines the height of the bar on the y-axis. The z-axis corresponds to the position number of the hopper within a row (position 1, position 2, position 3), while the x-axis identifies the hopper row (row A, row B, row C) in which the hopper is positioned in the grid pattern. This visual display of the particulate P evacuated from each hopper provides an accurate snapshot of how the particulate P was distributed through the particulate collection system (here an electrostatic precipitator) over the selected time period. FIG. 8 shows a sample distribution of particulate collection over a one hour time period.

Figure 9:
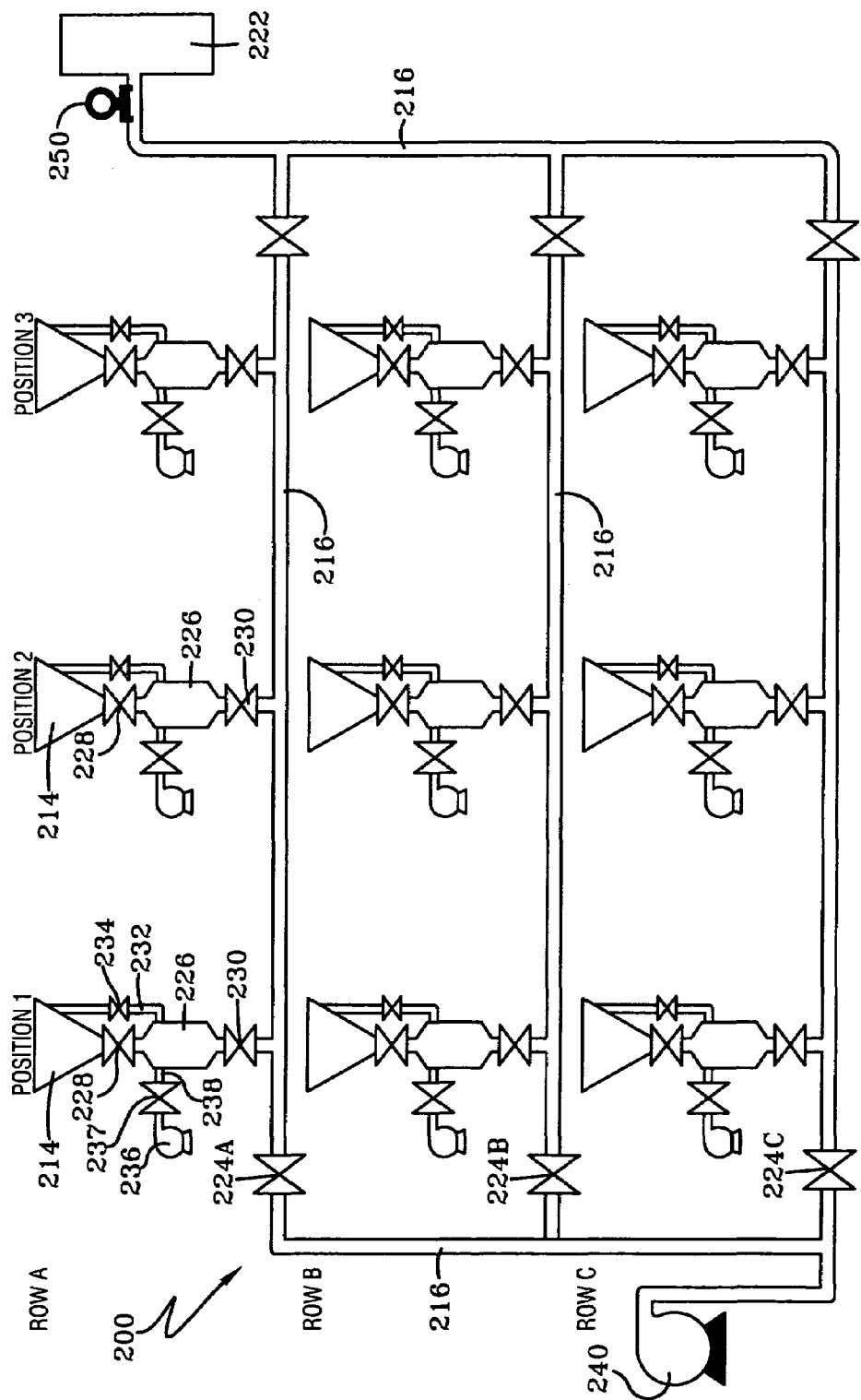
FIG. 9 is a schematic diagram of a hopper evacuation pressure system in accordance with the present invention.
Figure 10:
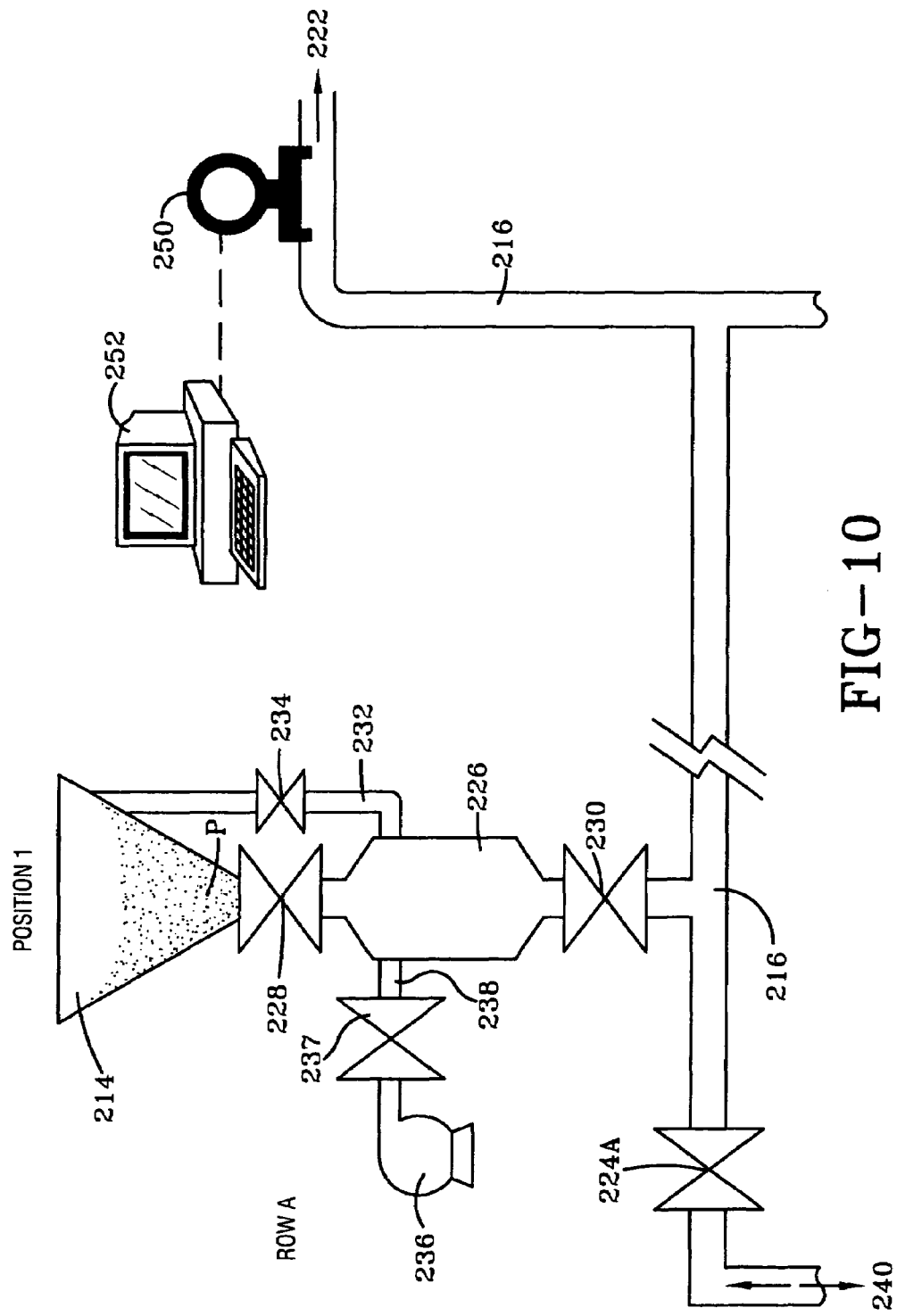
FIG. 10 is an exploded view of a single hopper and associated feeder, at position 1, row A of FIG. 9, and its communication with the transport line system in a hopper evacuation vacuum system according to the present invention.

In FIGS. 9 and 10, a first embodiment of a hopper evacuation pressure system according to the invention is shown and designated by the numeral 200. Pressure system 200 is similar in many respects to the prior art pressure system disclosed with reference to FIG. 3, and, like parts of pressure system 200 are identified with like numerals increased by 200. Pressure system 200 includes a plurality of hoppers 214 arranged in a grid pattern, and operates substantially as described in the background section with reference to FIG. 3. Hoppers 214 communicate with transport line system 216 through feeders 226.

It should be noted that, for purposes of interpreting the claims herein, the term "collection vessel" is to be understood as including hoppers and feeders, as well as other functionally similar container elements in particulate evacuation systems. However, the terms "feeder" and "feeders," when specifically used in the claims, are to be understood as covering the types of feeders disclosed herein as interacting with hoppers, and functional equivalents thereof. This latter aspect should be clear from the claims themselves, wherein feeders are only mentioned in relation to hoppers.

Only one feeder 226, empties into transport line system 216 at a time, and transport line system 216 is pressurized to transport particulate P to a storage vessel 222. A hopper 214 and associated feeder 226, at row A, position 1, is shown in FIG. 10, and the emptying of this hopper 214 and feeder 226 is considered below, with the understanding that other hoppers 214 and feeders 226 at other positions and rows empty in a similar manner at their allotted time in the emptying cycle.

With particular reference to FIG. 10, feeder vent line 232 is opened at valve 234 to equalize the pressures within hopper 214 and feeder 226. Thereafter, hopper outlet gate 228 is opened to feeder 226, and particulate within hopper 214 falls to feeder 226. After hopper outlet gate 228 is closed, feeder 226 is pressurized slightly above the pressure of transport line system 216, through a pressure source 236, feeder pressure line 238, and valve 237. Feeder outlet gate 230 is then opened, and the collected particulate P flow by gravity and the slight pressure differential into transport line system 216. Valve 224A, associated with hopper row A, is opened, while valves 224B and 224C to all other hopper rows are closed, such that the pressure supplied by system blower 240 is selectively applied to hopper row A. Once the appropriate valves 224B and 224C (not associated with the emptying hopper 214 of FIG. 9) are closed and the appropriate valve 224A (associated with the emptying hopper 214 of FIG. 9) is opened, particulate P are emptied by opening feeder outlet gate 230 to allow particulate P to fall to transport line system 216. Feeder outlet gate 230 is closed and collected particulate P discharged into transport line system 216 are transported to storage vessel 222, by the positive pressure differential generated by system blower 240.

Figure 7:
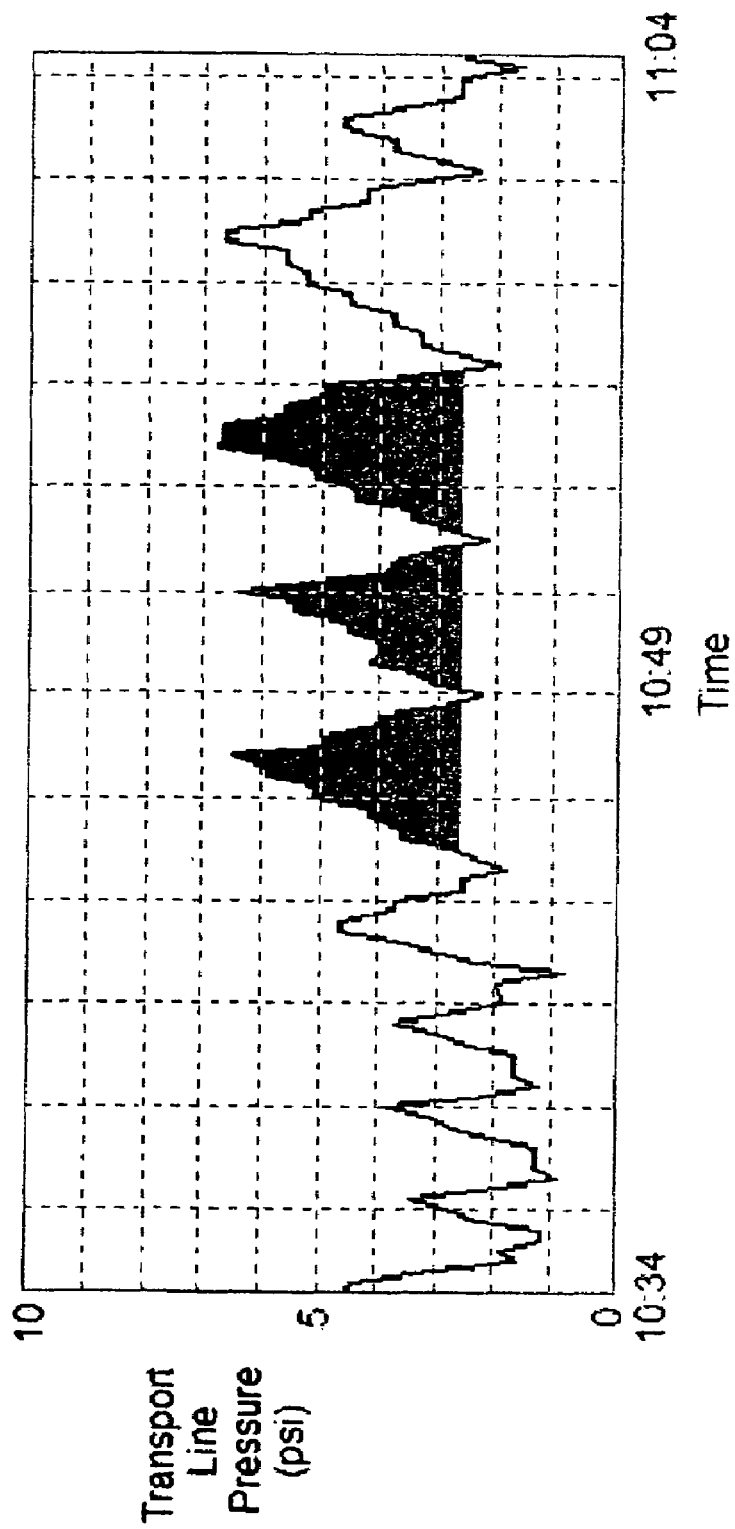
FIG. 7 is an exemplary plot of line pressure versus time during hopper (pressure system) evacuation.

Every time particulate P falls out of one of the feeders 226 and into transport line system 216 (i.e., when outlet gate 230 opens), the pressure in transport line system 216 increases. A pressure sensor 250 reads pressure data corresponding to the change in pressure in transport line system 216 each time a feeder outlet gate 230 is opened (here, hopper 214 and feeder 226 of hopper row A, position 1 are being considered). As mentioned above, the data read need not be pressure data, and may be any process data indicative of the amount of particulate that is emptied. The pressure data is transmitted to a microprocessor 252 or other data processor capable of manipulating the data received. The amount of particulate P evacuated from each hopper 214 and associated feeder 226 is based upon integrating under the pressure curve (via microprocessor 252) for the time that the outlet gate 230 was opened. This is generally shown in FIG. 7, and has already been described with respect to the vacuum system 100. The application of this concept to the pressure system 200 will be readily appreciated. The integration value obtained is representative of the amount of particulate P that left the feeder 226 and associated hopper during its turn in the emptying sequence. The microprocessor 252 records and logs this pressure data, and, in preferred embodiments, this data is employed to graphically display the flow distribution with respect to each feeder 226 and associated hopper 214 within hopper evacuation pressure system 200. As already described, this information is preferably graphically displayed, most preferably in a three dimensional bar graph depicting hopper rows, hopper positions, and associated particulate amounts emptied.

Figure 11:
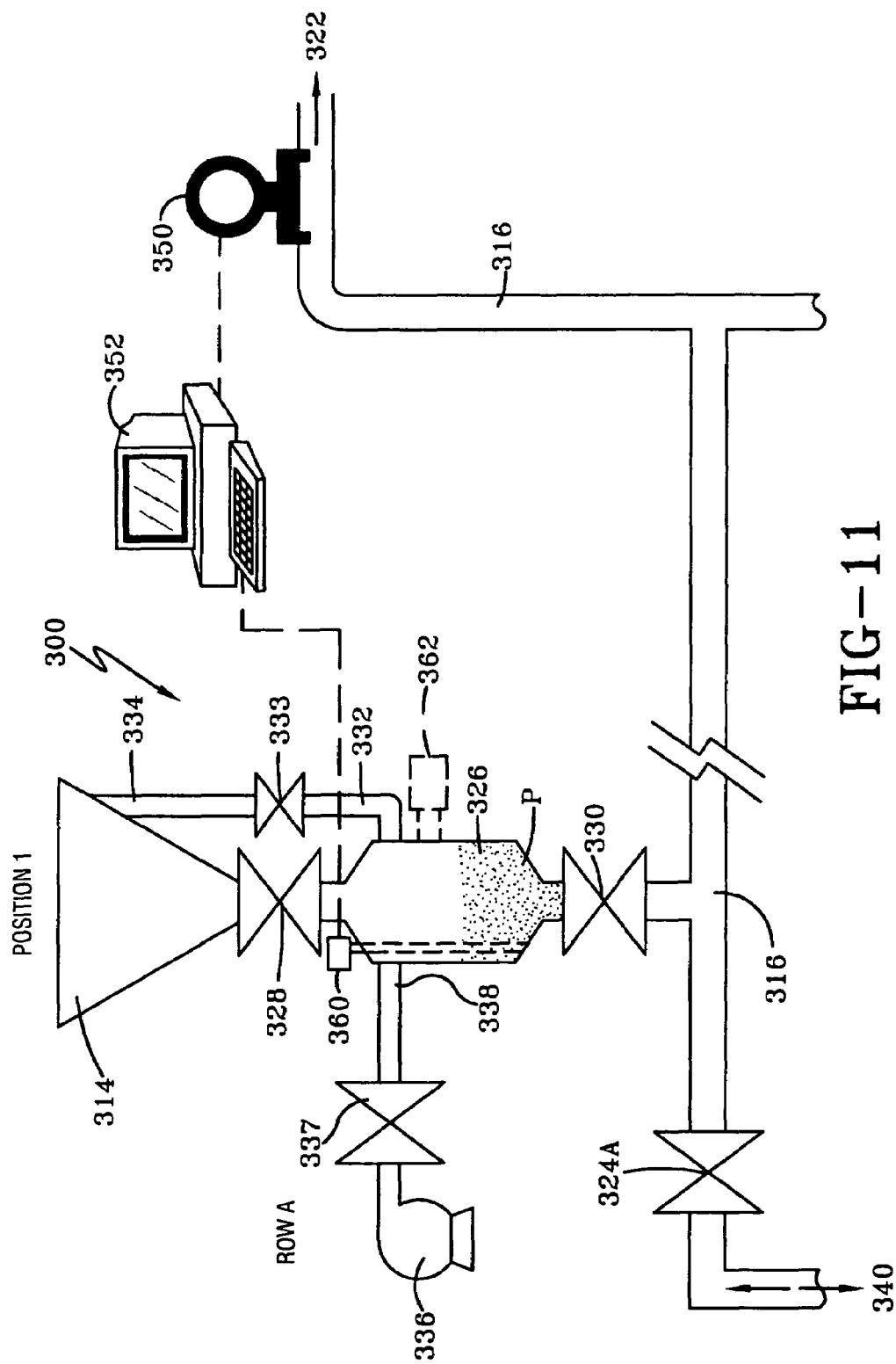
FIG. 11 is an exploded view of an alternative hopper evacuation pressure system according to this invention, employing sensors for determining data indicative of the volume of particulate emptied from a hopper, wherein a single hopper and associated feeder is shown as in FIGS. 5 and 10, with the understanding that the hopper and feeder shown are representative of one hopper/feeder within a grid pattern.

Referring now to FIG. 11, a second embodiment for a hopper evacuation pressure system according to the invention is shown and designated by the numeral 300. Pressure system 300 is similar in many respects to the prior art pressure system disclosed with reference to FIG. 3, and like parts of pressure system 300 are identified with like numerals increased by 300. While only one hopper 314, from row A, position 1, and its communication with transport line system 316 is shown in FIG. 10, it will be appreciated that pressure system 300 includes a plurality of hoppers 314 arranged in a grid pattern. Hoppers 314 communicate with transport line system 316 through feeders 326.

Figure 3:
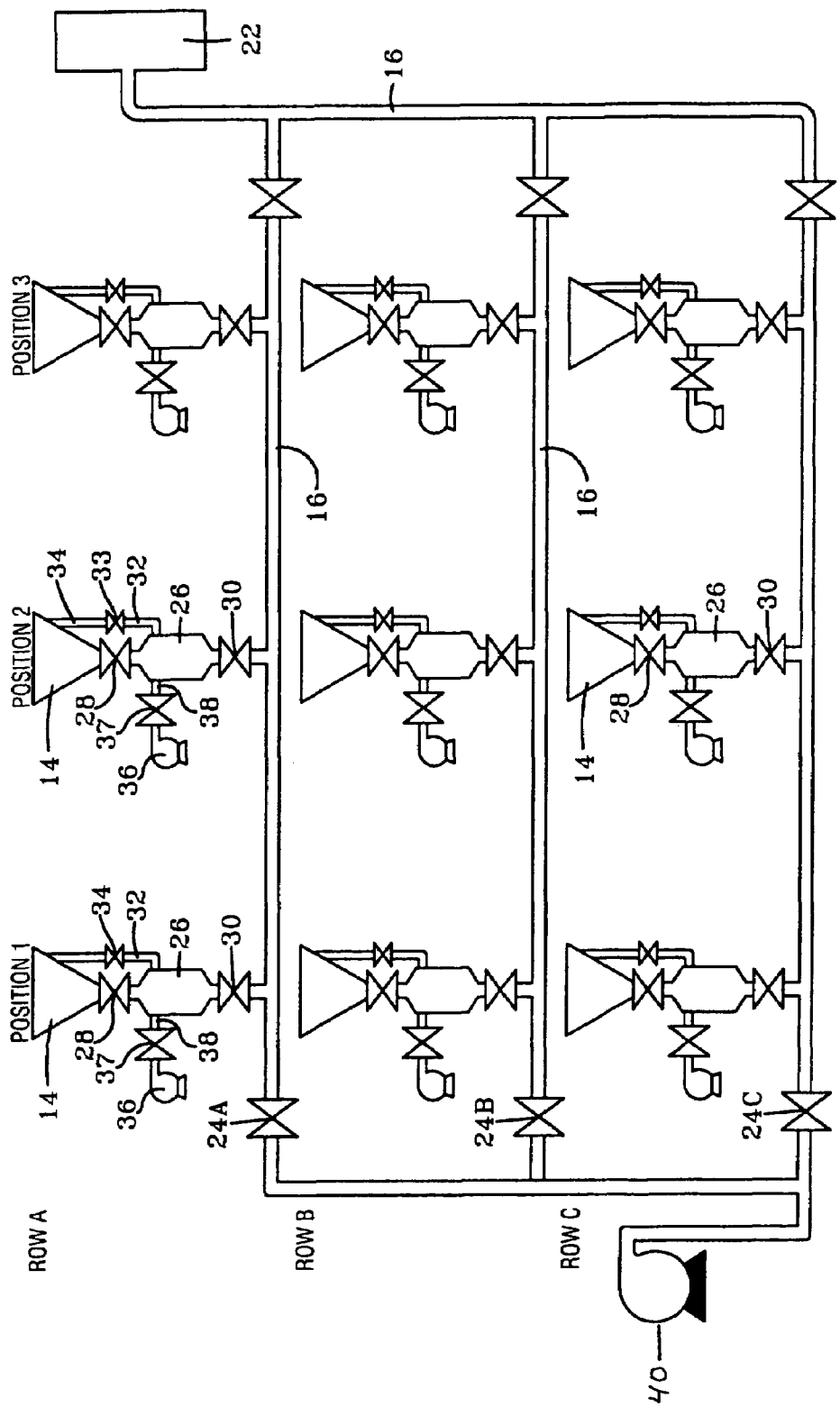
FIG. 3 is a schematic diagram of a hopper evacuation pressure system, wherein the plurality of hoppers form a grid pattern.

Pressure system 300 may operate substantially as described in the background section with reference to FIG. 3, wherein only one feeder 326 empties into transport line system 316 at a time. Alternatively, because pressure system 300 employs level sensors (described below) within the feeders 326, pressure system 300 may be operated in a manner that allows multiple feeders 326 to empty to transport line system 316 at any given time. Neither of these methods requires recording pressure data upon opening a feeder outlet gate 328, such that it is not necessary to employ pressure sensors 350 such as pressure sensors 250 employed in pressure system 200.

As in prior pressure system embodiments, feeder vent line 332 is opened at valve 334 to equalize the pressures within hopper 314 and feeder 326. Thereafter, hopper outlet gate 328 is opened to feeder 326, and particulate within hopper 314 fall to feeder 326. After hopper outlet gate 328 is closed, feeder 326 is pressurized slightly above the pressure of transport line system 316, through a pressure source 336, feeder pressure line 338, and valve 337. Feeder outlet gate 330 is then opened, and the collected particulate P flow by gravity and the slight pressure differential into transport line system 316. Feeder outlet gate 330 is closed and particulate P discharged into transport line system 316 are transported to storage vessel 322, by the positive pressure differential generated by system blower 340.

A continuous level sensor 360 is provided in each feeder 326 to extend along the height thereof and measure the height of the particulate P that accumulate therein. The moment that feeder outlet gate 328 opens, a reading of the height of particulate P is taken from continuous level sensor 360, and, immediately after feeder outlet gate 328 closes, another particulate height reading is taken. Continuous level sensor 360, like pressure sensors 130 and 230, transmits these readings to a microprocessor 352, where the two readings are compared, and the difference between them is recorded. The recorded value represents a percentage of the total volume of feeder 326, and, thus, by multiplying this value by the feeder volume, the amount of particulate P emptied from feeder 326 is determined. The microprocessor 352 records and logs this particulate collection data, and, in preferred embodiments, this data is employed to graphically display the flow distribution within the hopper evacuation system 300. As in other embodiments, this information is preferably graphically displayed, most preferably in a three dimensional bar graph depicting hopper rows, hopper positions, and associated particulate amounts emptied.

As an alternative to the continuous level sensor 360, a point level sensor 362 may be employed, as shown in phantom in FIG. 10. The placement of point level sensor 362 corresponds with a percentage of the volume of feeder 326, and the feeder performs its empty cycle when point level sensor 362 becomes covered with particulate. Each time feeder 326 is cycled, point level sensor 362 transitions from being covered to being uncovered (as particulate enters transport line system 316), and the particulate volume corresponding to the placement of point level sensor 362 is transmitted to microprocessor 352 and logged and displayed substantially as described above with respect to other embodiments.

In each of the embodiments disclosed above, particulate evacuation data is read, transmitted, logged, and, optionally, graphically displayed. The logged data is preferably also employed to troubleshoot the evacuation systems. The microprocessor, through appropriate software, stores the data that is constantly read and logged as described above. This data is periodically reviewed to check if there are any problems with the operation of the evacuation system.

The microprocessor keeps track of how much particulate is removed from each hopper (in the vacuum systems) or feeder (in the pressure systems) during each emptying cycle. The particulate removed per cycle is averaged for each hopper/feeder (collection vessel), over two user-defined time periods, a "long period" and a "short period." The long period average represents the average amount of particulate that is removed from a collection vessel per evacuation event over the long period of time. The short period average represents the average amount of particulate that is removed from a collection vessel per evacuation event over the short period of time. These values have different ranges for different collection vessels depending on their location in the grid pattern. And one vessel may have a relatively higher average amount of particulate per evacuation when compared to a different vessel.

When looking for a problem with a collection vessel that regularly sees a high average amount of particulate per cycle, only a small difference (20%-40%) between the long period and short period averages is necessary to conclude that there may be a problem with collection and evacuation. For a vessel that regularly collects and evacuates a low average amount of particulate per cycle a more drastic difference (50%-80%) between the short and long period averages is necessary before an alarm signal should be provided. In this case the alarm signal would indicate that the vessel is currently evacuating significantly less particulate than it had previously. Thus, the long period average and the short period average are compared to determine if there is a problem with the operation of the evacuation system. When the long period average and the short period average are compared, a collection vessel is considered to be malfunctioning if the averages differ by a significant percentage as determined by the system cycle. This difference would indicate that the particulate in the hopper is not being removed, and that action should be taken to return the system to working order.

The short period may range from 15 minutes up to about 3 hours, and is generally selected based upon how often the system cycles. The long period may range from 1 to 24 hours, and is generally selected based upon how often the system cycles.

The microprocessor also keeps track of the average amount of particulate collected in an entire row of hoppers/feeders (collection vessels) during each "short period." This "row average" is the sum of the "short period" averages for each collection vessel in the row, divided by the number of vessels in that row. The "row average" is compared to the short period average for each individual vessel to determine if there is a problem with the operation of the evacuation system. Collection vessels in the same row should evacuate a similar average amount of particulate per evacuation event. And if the short period average for a collection vessel differs from its row average by a significant amount as determined by the process, it indicates that the particulate in the vessel is not being emptied out. In some rows where there is regularly a relatively high average amount of particulate per evacuation cycle, a small difference (20-40%) between the short period average and row average will indicate that the vessel is not functioning correctly, and an alarm is provided. In other rows, where there is regularly very little particulate evacuated per evacuation event a greater difference (50-80%) between the short period average and the row average will indicate that the vessel is not functioning correctly, and an alarm is provided. In this case the alarm signal would simply indicate that the vessel under study is evacuating significantly less particulate than the other vessels in the same row. The microprocessor generates an alarm signal indicating that the evacuation system is not functioning correctly and indicates which vessel(s) and/or row(s) are experiencing problems.

For example, consider the following information as collected by the microprocessor:
Row A Position 1 "short period average": 28
Row A Position 2 "short period average": 29
Row A Position 3 "short period average": 13
Row A Position 4 "short period average": 25,
which yields the following row average for Row A:

$$\text{Row } A \text{ average}=(28+29+13+25)/4=23.75.$$

An alarm signal would be provided for Row A Position 3, because its short period average differs dramatically from the row average, indicating that the collection means above the collection vessel in this position may not be properly functioning.

Hoppers are organized in a grid pattern below the collection system. In the case of a system beneath an electrostatic precipitator, usually one hopper will be associated with one electrical section, although sometimes a hopper may cover only a part of a given electrical section or may overlap and cover more than one electrical section. Hoppers cover the complete collecting area of electrostatic precipitators, so all of the electrical sections of the precipitator are over one or more hoppers.

In each of the embodiments disclosed above, particulate evacuation data is read, transmitted, logged, and, optionally, graphically displayed. The logged data is preferably also employed to troubleshoot the collection systems above the evacuation systems. The microprocessor, through appropriate software, stores the data that is constantly read and logged as described above. This data is periodically reviewed to check if there are any problems with the operation of the collection system.

The microprocessor keeps track of how much particulate is removed from each hopper (in the vacuum systems) or feeder (in the pressure systems) during each emptying cycle. This data is directly related to how much particulate was collected in the electrical section(s) above the hopper. Because precipitator theory indicates a particular pattern for particulate distribution, variation from this pattern in ash collection across hopper positions and rows can indicate gas and particulate distribution problems in the precipitator.

Variations in collection patterns over a period of time in which process conditions do not vary indicate changes in performance of the electrical sections above the hopper(s) displaying the collection pattern variation. These changes in performance could be caused by electrical or mechanical degradation of the section associated with the hopper(s). Variations in collection during a period before process changes and during the same duration after process changes can be used to determine if the precipitator is functioning correctly. Comparing the graphic display of the evacuated ash during a time period before a given process change, and during the same length time period after the process change can show how the process change affects the collection efficiency in the precipitator. Although this aspect has been disclosed in relation to an electrostatic precipitator and the performance of electrical sections thereof, it will be appreciated that the particulate distribution in other collection systems may be predicted based upon theory and the theoretical distribution may be compared to particulate distribution as monitored by the microprocessor.

Figure 12:
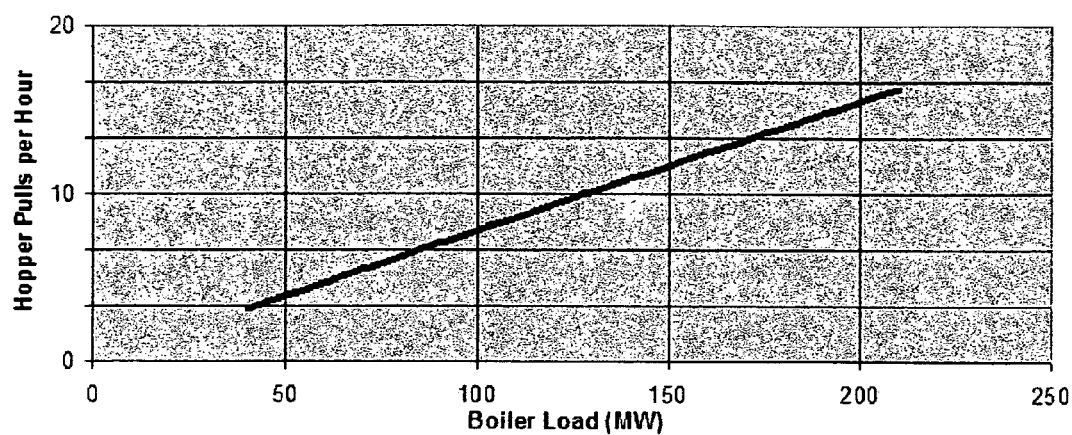
FIG. 12 is an exemplary plot of the number of required hopper evacuations per hour versus the boiler load in a coal burning operation.

In particularly preferred embodiments of this invention, the microprocessor communicates with a sensor that monitors the amount of particulate entering the collection system (i.e., the sensor monitors particulate loading). Particulate collection is proportional to the amount of particulate entering the collection system, and the demand for evacuating particulate from the collection system is proportional to the amount of particulate collected. Therefore, the demand for particulate evacuation is proportional to the particulate entering the collection system. When the signal indicating particulate loading is low the microprocessor will adjust the operation of the evacuation system to run proportionally slower (i.e., cycle less frequently) than when the signal indicates high particulate loading. This automatic optimization of the system operation will save unnecessary wear and tear on the system and promote longer component life. Notably, the actual amount of particulate entering the system might be monitored for use in optimizing the emptying rate of the evacuation system, or data indicative of the amount of particulate entering the system might be employed. For example, in a coal fired power plant, boiler load is measured in megawatts, and the higher the boiler load, the more coal needs to be burned, and the more ash is produced. This ash may be collected and removed by an electrostatic precipitator with a hopper evacuation system. The boiler load signal can therefore serve as the particulate loading signal, as the amount of particulate produced is dependent, at least in part, upon boiler load. With reference to FIG. 12, it can be seen that, for a particular coal fired power plant evacuation system, a graph of boiler load versus hopper evacuations can be created to help determine the emptying rate of a given system as based upon boiler load (i.e., data indicative of the amount of particulate entering the system under study).

Figure 13:
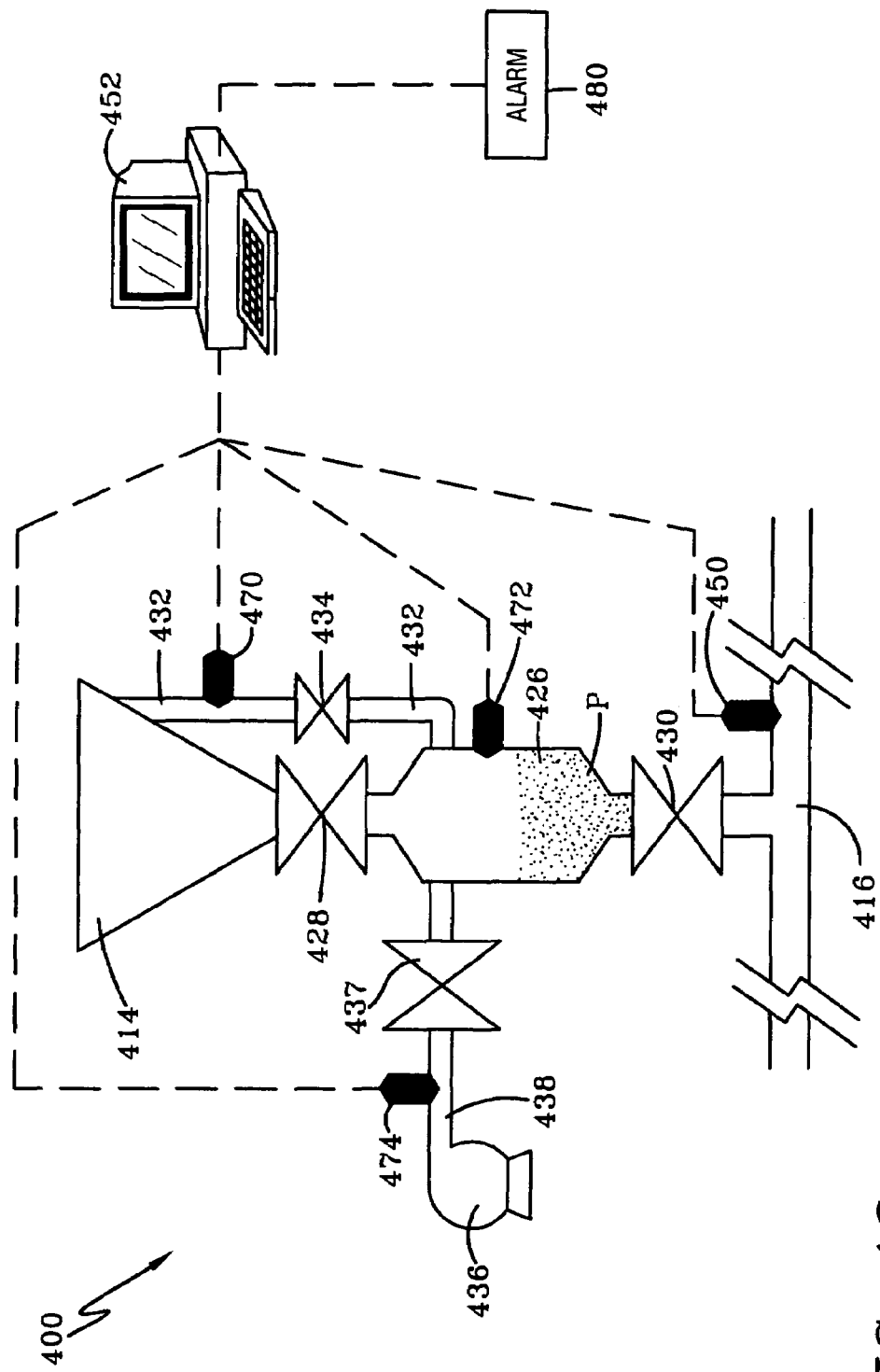
FIG. 13 is an exploded view of a single hopper and associated feeder in communication with a transport line system of a hopper evacuation pressure system, wherein elements are provided for diagnosing problems with the feeder operation.

When a pressure system, such as system 200 or 300, is employed, it is important that the "feeder operation" be accomplished without any complications. For purposes of the following disclosure, the "feeder operation" includes the emptying of the contents of a hopper into its associated feeder and the subsequent emptying of the contents of the feeder into the transport line system. Thus, referring now to FIG. 13, a method is disclosed for diagnosing problems in a feeder operation in a hopper evacuation pressure system 400.

Pressure system 400 includes at least one hopper 414 for collecting particulate. As with other embodiments, it is likely that hopper 414 will be one of many hoppers positioned throughout hopper rows. Hopper 414 communicates with feeder 426 through hopper outlet gate 428, and feeder 426 communicates with transport line system 416 through feeder outlet gate 430. Feeder vent line 432 communicates between hopper 414 and feeder 426 through a valve 434. Feeder pressure line 438 communicates between a pressure source 436 and feeder 426, though valve 437.

In a feeder operation, feeder vent line 432 is opened at valve 434 to equalize the pressures within hopper 214 and feeder 226. Thereafter, hopper outlet gate 428 is opened to feeder 426, and particulate within hopper 414 falls to feeder 426. After hopper outlet gate 428 is closed, feeder 426 is pressurized slightly above the pressure of transport line system 416, through pressure source 436, feeder pressure line 438, and valve 437. Feeder outlet gate 430 is then opened, and particulate P flows by gravity and the slight pressure differential into transport line system 416. Once the particulate are transferred to transport line system 416, feeder outlet gate 430 is closed and the particulate are transported to storage vessel 422 by a positive pressure differential generated by a system blower substantially in the same manner as generated by system blower 40 as described with respect to FIG. 3. Because this feeder operation depends upon pressure differentials, the present invention provides a method to monitor the various pressures within the system in order to diagnose potential problems in the feeder operation.

Particularly, hopper pressure sensor 470 is provided in close proximity to hopper 414 at the entrance to feeder vent line 432 to effectively monitor the pressure within hopper 414. Feeder pressure sensor 472 is provided in feeder 426 to monitor the pressure within feeder 426. Pressure line pressure sensor 474 is provided in pressure line 438 to monitor the pressure within pressure line 438. Transport line pressure sensor 450 is provided in transport line system. Each of these pressure sensors transmits pressure data to microprocessor 452, as represented by the dashed lines in FIG. 13. By comparing the pressure data at different periods within a feeder operation, the feeder operation can be diagnosed for potential problems.

Initially, when feeder vent line 432 is opened between hopper 414 and feeder 426, the pressure within hopper 414, as transmitted to microprocessor 452 by hopper pressure sensor 470, is compared to the pressure within feeder 426, as transmitted to microprocessor 452 by feeder pressure sensor 472. In order to feed particulate within hopper 414 to feeder 426, the pressure within hopper 414 must be greater than or equal to the pressure within feeder 426, otherwise the greater pressure within feeder 426 would frustrate the transfer of the particulate. Thus, after feeder vent line 432 is opened and the pressures transmitted by hopper pressure sensor 470 and feeder pressure sensor 472 are compared, microprocessor 452 provides and alarm, as at 480, if the pressure transmitted by hopper pressure sensor 470 is less than the pressure transmitted by feeder pressure sensor 472. If the pressure in hopper 414 is greater than or equal to the pressure in feeder 426, the feeder operation continues without an alarm.

Next, the hopper outlet gate 428 is closed as is feeder vent line 432, and feeder pressure line 438 is opened, at valve 437, to communicate between feeder 426 and pressure source 436. At this point, the pressures transmitted by feeder pressure sensor 472 and transport line pressure sensor 450 are compared, and, if the pressure transmitted by feeder presser sensor 472 is less than the pressure transmitted by transport line pressure sensor 450, microprocessor 452 outputs an alarm 480. It is necessary that the pressure within transport line system 416 be less than the pressure within feeder 426, if the particulate P within feeder 426 is to be transferred to transport line system 416. If the pressure within the feeder 426is greater than or equal to the pressure within transport line system 416, the feeder operation continues by the opening of feeder outlet gate 430 to transport line system 416.

Gravitational forces and the slight pressure differential generated by pressure source 436 cause the particulate in feeder 426 to be transported to transport line system 416. During the emptying of feeder 426, the pressures transmitted by feeder pressure sensor 472, pressure line pressure sensor 474, and transport line pressure sensor 450 are compared. The pressure in feeder 426 should stay between the pressure in feeder pressure line 438 and the pressure within transport line system 416. Thus, if the pressure in feeder 426 is determined to be less than the pressure within feeder pressure line 438 or greater than the pressure within transport line system 416, the microprocessor 452 provides an alarm 480.

Through the forgoing methods, particulate collection systems can be monitored and their operation altered to increase efficiency and/or troubleshoot the system. Thus it can be seen that the objects of the invention have been satisfied by the methods presented above. While in accordance with the patent statutes only the best mode and preferred embodiments of the invention have been presented and described in detail, the invention is not limited thereto or thereby. Accordingly, for an appreciation of the full scope and breadth of the invention, reference should be made to the following claims.

The invention claimed is:

1. A method for diagnosing particulate flow distribution within a particulate evacuation system that includes a plurality of collection vessels for collecting particulate and emptying the particulate to a transport line system in an emptying event, the method comprising the steps of:
    reading process data indicative of the amount of particulate emptied from each of the plurality of collection vessels during an emptying event;
    determining the particulate flow distribution within the plurality of collection vessels of the particulate evacuation system, wherein the particulate flow distribution is derived from the process data;
    storing the particulate flow distribution for use with a particulate flow distribution derived from process data in one or more subsequent emptying events; and
    making adjustments to the operation of the particulate evacuation system as necessary in light of the particulate flow distributions read, determined and stored in said steps of reading process data, determining the particulate flow distribution and storing the particulate flow distribution.

2. The method of claim 1, wherein the plurality of collection vessels are arrayed in a grid pattern, and said step of determining the particulate flow distribution includes:
    graphically displaying the process data by presenting the amount of particulate emptied from each of the plurality of collection vessels as associated with its position in the grid pattern.

3. The method of claim 2, wherein said step of graphically displaying the process data includes:
    providing a three dimensional bar graph including:
        a first position axis to identify a row position for each one of the plurality of collection vessels;
        a second position axis to identify a placement position for each one of the plurality of collection vessels, wherein the row position and the placement position together identify the location of a particular collection vessel; and
        a third axis representing the amount of particulate emptied from each collection vessel during a given time period.

4. The method of claim 1, wherein said step of reading process data includes:
    reading pressure data indicating the change in pressure in the transport line system during the time that one of the plurality of collection vessels empties to the transport line system; and
    integrating a curve of the pressure data versus time to provide the process data that is indicative of the amount of particulate emptied from that particular collection vessel.

5. The method of claim 1, wherein the plurality of collection vessels are a plurality of feeders arranged in a grid pattern, the plurality of feeders receiving particulate from associated hoppers, and wherein each one of said plurality of feeders includes an inlet gate, for receiving the particulate from its associated hopper, and an outlet gate that communicates with the transport line system to empty particulate into the transport line system, and wherein said step of graphically displaying the process data includes presenting the amount of particulate emptied from each of the plurality of feeders as associated with the position of each particular feeder within the grid pattern established by the plurality of feeders.

6. The method of claim 5, wherein said step of graphically displaying the process data includes:
    providing a three dimensional bar graph including:
        a first position axis to identify a row position for each one of the plurality of feeders;
        a second position axis to identify a placement position for each one of the plurality of feeders, wherein the row position and the placement position together identify the location of a particular feeder; and
        a third axis representing the amount of particulate emptied from each feeder during a given time period.

7. The method of claim 6, wherein said step of reading process data includes:
    reading pressure data indicating the change in pressure in the transport line system during the time that one of the plurality of feeders empties to the transport line system; and
    integrating a curve of the pressure data versus time to provide the process data that is indicative of the amount of particulate emptied from that particular feeder.

8. The method of claim 1, wherein said plurality of collection vessels each have associated therewith a continuous level sensor that senses the volume level of particulate within the associated collection vessel, and said step of reading process data includes reading the volume level indicated by the continuous level sensor when the associated collection vessel is emptied.

9. The method of claim 1, wherein said plurality of collection vessels each have associated therewith a point level sensor placed at a position that corresponds to a fixed volume level of particulate within the associated collection vessel, and the method further comprises emptying each of said plurality of collection vessels when the volume level of particulate therein reaches the associated point level sensor, said step of reading process data including reading the fixed volume level indicated by the point level sensor when the associated collection vessel is emptied.

10. The method of claim 1, further comprising the steps of:
    calculating a theoretical pattern of particulate distribution for the particulate collection system; and
    comparing this theoretical pattern of particulate distribution to the particulate flow distribution derived from the process data in said step of determining the particulate flow distribution.

11. The method of claim 1, wherein the plurality of collection vessels empty particulate to the transport line on a time-based cycle, and the method further comprises monitoring the amount of particulate being loaded to the particulate collection system, and changing the time-based emptying cycle based upon the amount of particulate being loaded.

12. A method for diagnosing particulate flow distribution within a particulate evacuation system that includes a plurality of collection vessels for collecting particulate and emptying the particulate to a transport line system in an emptying event, the method comprising the steps of:

reading process data indicative of the amount of particulate emptied from each of the plurality of collection vessels during an emptying event;

determining the particulate flow distribution within the plurality of collection vessels of the particulate evacuation system, wherein the particulate flow distribution is derived from the process data;

storing the average amount of particulate emptied from each collection vessel per emptying event over a short time period;

storing the average amount of particulate emptied from each collection vessel per emptying event over a long time period, wherein the long time period is greater than the short time period;

comparing for each collection vessel the average amount of particulate emptied from each collection vessel per emptying event over the short time period against the amount of particulate emptied from each collection vessel per emptying event over the long time period; and providing a signal if the average amount of particulate emptied from each collection vessel per emptying event over the short time period differs from the amount of particulate emptied from each collection vessel per emptying event over the long time period.

13. A method for diagnosing particulate flow distribution within a particulate evacuation system that includes a plurality of collection vessels for collecting particulate and emptying the particulate to a transport line system in an emptying event, wherein said plurality of collection vessels are arrayed across multiple rows defined by sharing a common transport line, and each collection vessel empties particulate to the transport line of its associated row in an emptying event, the method comprising the steps of:

reading process data indicative of the amount of particulate emptied from each of the plurality of collection vessels during an emptying event;

determining the particulate flow distribution within the plurality of collection vessels of the particulate evacuation system, wherein the particulate flow distribution is derived from the process data;

storing the average amount of particulate emptied from each collection vessel per emptying event over a short time period;

storing a row average per emptying event, wherein the row average is the amount of particulate emptied from each row of collection vessels per emptying event divided by the number of collection vessels in the row, the row average being calculated over the same short time period;

comparing, for each collection vessel, the average amount of particulate emptied in an emptying event from that particular collection vessel over the short time period against the row average of particulate emptied in an emptying event from that collection vessel's associated row over the short time period; and providing a signal if the average amount of particulate emptied from a given collection vessel over the short time period differs from the row average over that same short time period.

14. A method for diagnosing problems in a feeder operation in a particulate collection system including a hopper for collecting particulate; a feeder having an inlet gate associated with the hopper and an outlet gate associated with a transport line; a vent line communicating between the hopper and the feeder; and a pressurization line communicating between the feeder and a pressure source, wherein both the vent line and the pressurization line may be selectively opened and closed, the method comprising the steps of:

monitoring the pressure within the hopper;

monitoring the pressure within the feeder;

opening the vent line that communicates between the hopper and the feeder;

after said step of opening the vent line, comparing the pressure within the feeder to the pressure within the hopper; and providing a signal if the pressure within the feeder does not equalize with the pressure within the hopper after said step of opening the vent line.

15. The method of claim 14, wherein, if the pressure within the feeder is less than or equal to the pressure within the hopper after said step of opening the vent line, the method further comprises:

maintaining the vent line open, and opening the inlet gate to allow particulate collected in the hopper to enter the feeder.

16. The method of claim 15, wherein, after said step of opening the inlet gate, the method further comprises:

monitoring the pressure within the transport line;

closing the inlet gate and the vent line and thereafter opening the pressurization line that communicates between the feeder and the pressure source; and, after said step of opening the pressurization line, comparing the pressure within the feeder to the pressure of the transport line.

17. The method of claim 16, further comprising providing a signal if the pressure within the feeder is less than the pressure of the transport line.

18. The method of claim 17, wherein, if the pressure within the feeder is greater than or equal to the pressure within the transport line, the method further comprises:

maintaining the pressurization line open; and opening the outlet gate to allow particulate collected in the feeder to enter the transport line.

19. The method of claim 18, wherein, after said step of opening the outlet gate, the method further comprises:

monitoring the pressure within the pressurization line;

comparing the pressure within the feeder to the pressure within the transport line and the pressure within the pressurization line; and providing a signal if the pressure within the feeder is not between the pressure within the pressurization line and the pressure within the transport line.

20. The method of claim 14, further comprising the steps of fixing the particulate collection system if the pressure within the feeder does not equalize with the pressure within the hopper after said step of opening the vent line.

* * * * *